United States Patent [19]

Kobayashi et al.

[11] Patent Number: 4,762,008
[45] Date of Patent: Aug. 9, 1988

[54] TORQUE DETECTING APPARATUS

[75] Inventors: Tadahiko Kobayashi; Masashi Sahashi; Koichiro Inomata, all of Yokohama, Japan

[73] Assignee: Kabushiki Kaisha Toshiba, Kawasaki, Japan

[21] Appl. No.: 31,279

[22] Filed: Mar. 30, 1987

[30] Foreign Application Priority Data

May 13, 1986 [JP] Japan .................... 61-109087
Oct. 30, 1986 [JP] Japan .................... 61-259090

[51] Int. Cl.⁴ .............................................. G01L 3/10
[52] U.S. Cl. .............................................. 73/862.36
[58] Field of Search ............. 73/862.36, 779, DIG. 2

[56] References Cited

U.S. PATENT DOCUMENTS 4,374,665 2/1983 Koon .................... 73/862.36 X
4,506,554 3/1985 Blomkvist et al. .
4,590,807 5/1986 Kobayashi et al. .
4,631,796 12/1986 Inomata .................... 73/862.36 X Primary Examiner—Charles A. Ruehl
Attorney, Agent, or Firm—Oblon, Fisher, Spivak, McClelland & Maier

[57] ABSTRACT

A torque detecting apparatus utilizing a magnetoelastic effect comprising one or more pairs of thin magnetic metal strips affixed to a torque-transmitting shaft subjected to torque detection and having magnetic anisotropy induced in a predetermined direction, and one or more pairs of detecting cores paired with the above one or more pairs of thin magnetic metal strips, fixed in contact with the thin magnetic metal strips, each of the cores of the one or more pairs of detecting cores having a detecting coil wound therearound, In one embodiment, the torque detecting apparatus utilizes a magnetoelastic effect of thin magnetic metal strip wherein the absolute value of saturated magnetostriction constant λs of the thin magnetic metal strip is less than $1 \times 10^{-6}$.

15 Claims, 5 Drawing Sheets

TORQUE DETECTING APPARATUS

BACKGROUND OF THE INVENTION

1. Field of the Invention

The present invention relates to a torque detecting apparatus for monitoring the amount of torque imposed on a torque-transmitting shaft.

2. Description of the Prior Art

In the fields of motor vehicles, ships, airplanes, and various machine tools, deformation of components in the course of operation must be nondestructively measured with high precision. In order to satisfy such needs, various types of means for detecting the amount of torque imposed on the torque-transmitting shafts or the like have been proposed.

A typical basic conventional device used in torque measurement is a strain gauge, exemplified by a metal-film strain gauge or a semiconductor strain gauge. Either gauge utilizes a change in the electrical resistance caused by deformation of a component when a stress load is imposed thereon. The change in electrical resistance is detected, and hence the imposed stress is detected. However, since a change in the electrical resistance of the metal-film strain gauge is very small, a detector having a high gain is required so as to obtain practical detecting sensitivity. In the case of the semiconductor strain gauge, the change in electrical resistance tends to fluctuate, and thus, the detecting accuracy and detecting stability are undesirably degraded.

In order to solve the above problems associated with strain gauges, a torque detecting apparatus utilizing the magnetoelastic effect of a magnetic metal material having a large magnetostrictive effect is proposed (Papers Tec. Meet. Magnetics, IEEJ, MAG-81-72). The principle of the above torque detecting apparatus will be briefly described.

Referring to FIG. 1, reference numeral 1 denotes a torque-transmitting shaft subjected to torque detection. Thin annular strip 2 of an amorphous magnetic alloy is wound around the torque-transmitting shaft, and is fixed thereon. Strip 2 has induced magnetic anisotropy Ku' 4 in a direction at an inclined angle $\theta$ with respect to circumferential direction 3. For illustrative convenience, conditions $\theta > 45°$, and saturated magnetostriction constant $(\lambda s) > 0$ are established. The magnetic material constituting strip 2 is selected from a material exhibiting soft magnetism, such as an amorphous magnetic alloy, Permalloy (an Fe—Ni alloy), or Sendust (an Fe—Al—Si alloy).

When torque 5 acts on torque-transmitting shaft 1, the stress generated by shaft 1 is transmitted to thin annular strip 2. Tension $\sigma$ is generated in strip 2, in a +45° direction. At the same time, compressive stress $-\sigma$ is generated in the -45° direction. The magnetostrictive effect of the stress generates induced magnetic anisotropy Ku" 6 directed toward the +45° direction with respect to the circumferential direction of strip 2. The magnitude of Ku" 6 is represented by Ku" $6 = 3\lambda s\sigma$.

The total magnetic anisotropy exhibited by thin annular strip 2 is changed to the total force of the preacted magnetic anisotropy Ku' 4 and stress-induced magnetic anisotropy Ku" 6 generated by the magnetostrictive effect, that is, Ku 7 in FIG. 1. By detecting the change in magnetic anisotropy, the stress generated in the thin annular strip, i.e., the torque imposed on the torque-transmitting shaft, can be detected.

In a conventional apparatus, a means for detecting a change in the magnetic anisotropy of thin annular strip 2 usually comprises a detection coil. The functioning of the detection coil will now be explained.

In general, magnetic permeability $\mu$ is changed in accordance with the direction of induced magnetic anisotropy, with respect to the direction of magnetic excitation. If the magnetic anisotropy of the thin magnetic strip is changed, magnetic flux density B of the strip is changed in accordance with $B = \mu H$. When a detection coil (not shown) is arranged near strip 2, the change in magnetic flux density B of strip 2 causes the detection coil to generate an e.m.f. (electromotive force). When the detection coil is connected to a detecting circuit and a change in voltage across the coil terminals is detected, the change in magnetic anisotropy of the thin annular strip, i.e., the magnitude of the torque imposed on the torque-transmitting shaft, can be detected. In the overall torque detecting apparatus, strip 2 and the detection coil serve as a sensor.

In the conventional torque detecting apparatus utilizing the magnetoelastic effect, the secondary sensor, such as the detection coil, is generally arranged so as to be separated from the thin annular strip serving as the primary sensor. Such a noncontact structure can be more easily mounted on the shaft, and does not require the use of any sliding parts which might generate friction. Therefore, the reliability of the torque detecting apparatus is improved.

However, since the secondary sensor is separated from the primary sensor and an air gap is formed therebetween, the intensity of the torque detection signal is lowered, and detecting sensibility is therefore degraded.

Another problem arises when the conventional torque detecting apparatus is applied to a torque transmitting shaft having a large diameter and a high output, such as a rolling mill or a cutter. More specifically, in the torque-transmitting shaft of a large DC motor for driving a rolling mill for heavy industrial use, the rated torque is about 0.8 kg/mm². However, in a specific application, such as in the rolling of a steel ingot, the torque is increased to 300 to 600%, i.e., about 5 kg/mm². In a conventional noncontact type torque detecting apparatus, the torque in the above specific application cannot be detected with high responsibility. In particular, the very large torque described above appears as torsional oscillation of about 200 Hz, and the conventional torque detecting apparatus cannot respond to such a frequency. Further, the linearity between the loaded torque and the magnetic anisotropy generated by thin annular strip 2 is insufficient. Satisfactory linearity is established only within the range encompassing the lowest torque values. The very large torque as described above falls outside the possible detection range.

Problems presented by the magnetoelastic characteristics of thin annular strip 2 will now be described below.

In the conventional torque detecting apparatus, the magnetic material for strip 2, serving as the primary sensor, comprises one having as large a saturated magnetostriction constant ($\lambda s$) as possible (e.g., $30 \times 10^{-6}$ or more) because an output produced by magnetoelastic effect is increased to thereby improve the detecting sensitivity. When constant $\lambda s$ is increased, the detection sensitivity can be improved. However, the linearity range of the output, with respect to the torque, becomes undesirably narrower. For this reason, the conventional torque detecting apparatus can be applied to only a limited, narrow torque range, and cannot be used in the case of a special application, such as a rolling mill or the like.

Thin annular strip 2 is prepared such that a thin ribbon having a predetermined magnetic anisotropy is bent according to the radius of curvature of torque-transmitting shaft 1. Therefore, anisotropy is induced in strip 2 by stress, upon its deformation. The magnetic anisotropy applied to strip 2 in advance, is degraded by the influence of magnetostriction. In fact, the anisotropy, upon deformation of strip 2, increases when saturated magnetostriction constant λs of the magnetic material constituting strip 2 is large, and torque detecting characteristics are adversely affected.

SUMMARY OF THE INVENTION

It is a first object of the present invention to improve a conventional torque detecting apparatus utilizing a magnetoelastic effect, and to provide a torque detecting apparatus capable of accurately detecting torque generated by, for example, a torque transmitting shaft of a rolling mill or a cutter. In order to achieve the first object of the present invention, a new form of coupling between a primary sensor and a secondary sensor is proposed, in order to improve the sensitivity of the torque detecting apparatus utilizing the magnetoelastic effect, as compared to the conventional strain gauge. In addition, the torque detecting apparatus according to the present invention can be effectively applied to a torque-transmitting shaft of large diameter.

It is a second object of the present invention to improve a conventional torque detecting apparatus utilizing a magnetoelastic effect, and to provide a torque detecting apparatus capable of producing an output having good linearity with respect to changes of torque within a wide torque range, and especially providing excellent detecting characteristics throughout a broad range of torque values.

In order to achieve the first object of the present invention, a torque detecting apparatus is provided, comprising:

one or more pairs of thin magnetic metal strips affixed to a torque-transmitting shaft subjected to torque-detection and having magnetic anisotropy induced in a predetermined direction; and one or more pairs of detecting cores paired with the above one or more pairs of thin magnetic metal strips, fixed in contact with the thin magnetic metal strips, each of the cores of the one or more pairs of detecting cores having a detecting coil wound therearound.

In the above torque detecting apparatus, the thin magnetic metal strip (i.e., the primary sensor) is in contact with the detecting core (i.e., the secondary sensor), to thereby constitute a closed magnetic circuit having no air gap. A change in the magnetic permeability of the magnetic metal, upon application of a stress on the primary sensor, can be detected by the detecting coil, without loss. A large torque detection signal, without loss, can be obtained, thereby improving the detection sensitivity. The detecting core is paired with the corresponding detecting coil, with the aim of achieving detection with linearity for both torque in the positive direction and torque in the negative direction, and this will accordingly be described below, in detail, with reference to the embodiment.

In order to achieve the second object of the present invention, a torque detecting apparatus is provided, wherein a thin magnetic metal strip having magnetic anisotropy induced in advance in a predetermined direction as a result of magnetic field annealing, is fixed on a torque-transmitting shaft subjected to torque-detection, a stress corresponding to the torque acting on the torque-transmitting shaft is applied to the thin magnetic metal strip, and a change in the magnetic characteristics of the strip is detected, thereby to enable measurement of the torque imposed on the torque-transmitting shaft. The absolute value of saturated magnetostriction constant λs of the thin magnetic metal strip is given by $|\lambda s| < 1 \times 10^{-6}$.

Extensive studies by the present inventor have proved that a thin magnetic metal strip having a saturated magnetostriction constant whose absolute value is less than $1 \times 10^{-6}$ exhibited excellent linearity throughout a wide range of stress values. Therefore, by using the thin magnetic metal strip as a primary sensor, a torque detecting apparatus capable of detecting stresses within a wide stress range can be provided.

It should be noted that, if the thin magnetic metal strip for achieving the second object is used in the torque detecting apparatus for achieving the first object, a better effect can be obtained.

DETAILED DESCRIPTION OF THE PREFERRED EMBODIMENT

Figure 1:
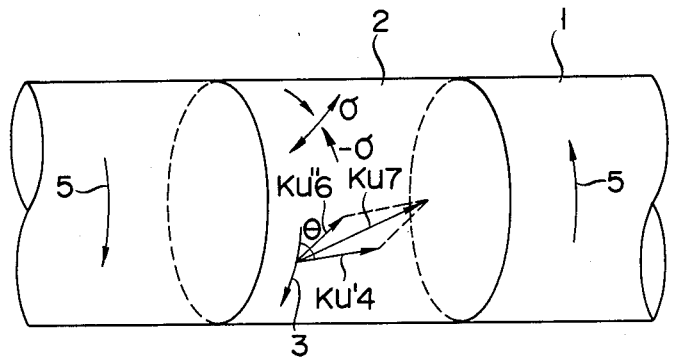
FIG. 1 is a schematic view for explaining the principle of a torque detecting apparatus utilizing a magnetoelastic effect.
Figure 2:
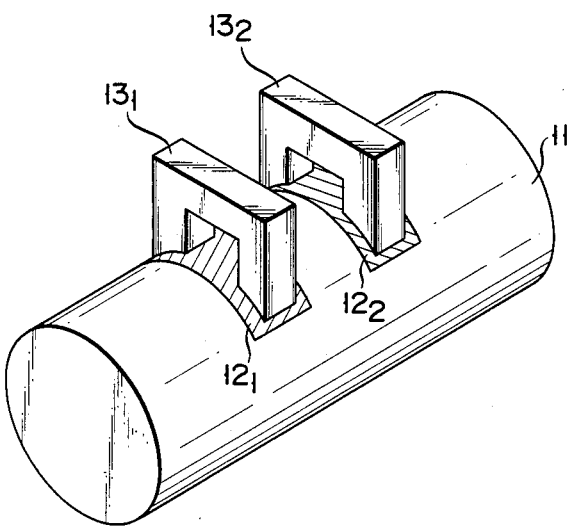
FIGS. 2 to 4 are schematic views of one embodiment of a torque detecting apparatus for achieving the first object of the present invention.
Figure 3:
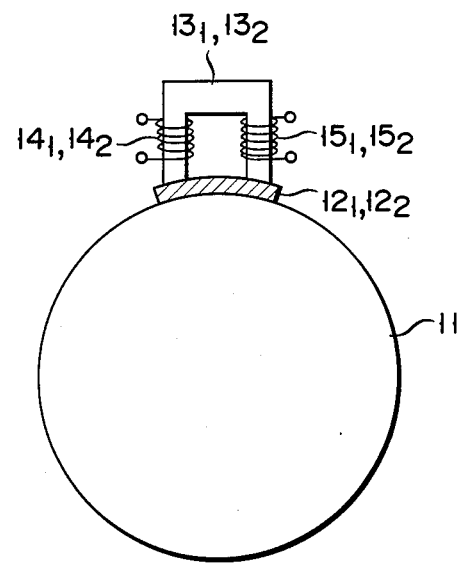
Figure 4:
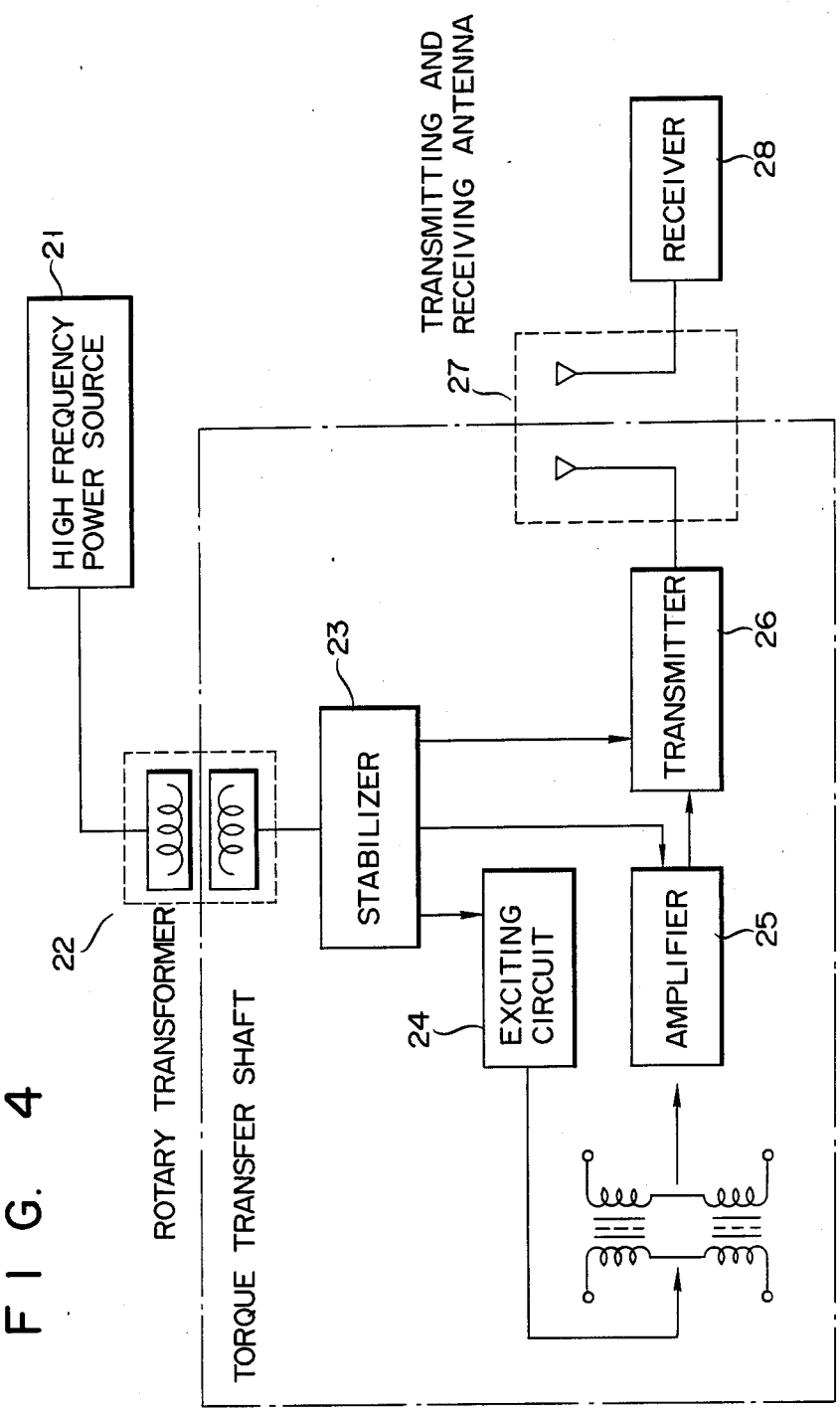

FIGS. 2 to 4 schematically show one embodiment of a torque detecting apparatus for achieving the first object of the present invention. Reference numeral 11 in FIGS. 2 and 3 denotes a torque-transmitting shaft. One pair of thin magnetic metal strips (a primary sensor) $12_1$ and $12_2$ are fixed on part of the surface of the torque-transmitting shaft along the circumferential direction thereof. Strips $12_1$ and $12_2$ have magnetic anisotropies $Ku_0$ in $+45°$ and $-45°$ directions with respect to the circumferential direction of shaft 11, respectively. Since the induced magnetic anisotropies $Ku_0$ previously given by magnetic field annealing of the pair of strips $12_1$ and $12_2$ have directions perpendicular to each other, torques in the positive and negative directions can be equally detected with good linearity. U-shaped detecting cores $13_1$ and $13_2$ made of a magnetic oxide are fixed on strips $12_1$ and $12_2$ along the circumferential direction of shaft 11, respectively. More specifically, strips $12_1$ and $12_2$ are in contact with cores $13_1$ and $13_2$, respectively, and no air gaps are formed therebetween. Excitation coils $14_1$ and $14_2$ and detecting coils $15_1$ and $15_2$ are wound around cores $13_1$ and $13_2$. Coils $15_1$ and $15_2$ are differentially connected, and a detecting output with good linearity can be obtained from the torque in the positive direction to the torque in the negative direction. The detecting cores, the excitation coils, and the detecting coils constitute a secondary sensor. The secondary and primary sensors constitute a torque detecting section. As is apparent from FIGS. 2 and 3, the torque detecting section constitutes a closed magnetic circuit.

FIG. 4 shows an overall arrangement of the torque detecting apparatus including the torque detecting section described above. A portion surrounded by the alternate long and short dashed line is fixed to torque-transmitting shaft 11. Referring to FIG. 4, reference numeral 21 denotes a high frequency power source arranged outside the torque-transmitting shaft. Power source 21 is connected to rotary transformer 22 for supplying power to stablizer 23 fixed on shaft 11. Rotary transformer 22 comprises a secondary coil fixed on shaft 11 and a primary coil located outside the secondary coil through a gap. The primary and secondary coils are coupled by an electrical inductive coupling but are not mechanically coupled. No friction occurs between the primary and secondary coils. A high frequency signal applied to stabilizer circuit 23 on the shaft 11 is converted into a DC voltage. The DC voltage is applied as a power source voltage to exciting circuit 24, transmitter 26, and amplifier converter 25. A high frequency current is supplied from exiting circuit 24 to excitation coils $14_1$ and $14_2$ in the torque detecting section, so that coils $14_1$ and $14_2$ are excited, thereby generating a magnetic flux in the closed magnetic circuit constituted by detecting cores $13_1$ and $13_2$ and thin magnetic metal strips $12_1$ and $12_2$. Voltages corresponding to a change in magnetic flux density of the closed magnetic circuit are generated by detecting coils $15_1$ and $15_2$. In this condition, a torque is imposed on torque-transmitting shaft 11, and stress change occurs in thin magnetic metal strips $12_1$ and $12_2$. The magnetic flux density of the closed magnetic circuit in the torque detecting section is changed, and a voltage across coils $15_1$ and $15_2$ is changed. In other words, the change in magnetic flux density causes a change in magnetic resistance in detecting coil. A change in voltage caused by a change in impedance appears at each of coils $15_1$ and $15_2$. A voltage signal generated by coils $15_1$ and $15_2$ is supplied to amplifier 25 and is converted into a torque detecting signal. This signal is sent from transmitter 26 to receiver 28 through transmitting/receiving antenna 27. The torque detecting signal received by receiver 28 is detected by a signal processor circuit (not shown) as a digital or analog torque value. In the above embodiment, amplifier 25 is coupled to the signal processor circuit by a radio wave. Employment of radio coupling allows the contact between thin magnetic metal strips $12_1$, $12_1$ and detecting cores $13_1$, $13_2$. If amplifier 25 is coupled to a signal processor circuit (not shown) through lines, the cord is wound around the torque-transmitting shaft. The structure obtained by fixing the main part of the torque detecting apparatus on torque-transmitting shaft 11 can be readily understood from the fact that the apparatus can be applied to shaft 11 having a maximum diameter of several meters.

In the torque detecting apparatus of the above embodiment, unlike in the conventional apparatus, the torque detecting section constitutes the closed magnetic circuit wherein no air gap is formed between the primary and secondary sensors. A large detecting output without a loss can be produced, and a S/N ratio of the output can be increased. At the same time, the structure of contact between the primary and secondary sensors can accurately detect a special torque appearing as a 200-Hz torsional oscillation as previously mentioned. In the embodiment wherein thin magnetic metal strips $12_1$ and $12_2$ are not formed on the entire surface of torque-transmitting shaft 11 along the circumferential direction, if primary sensor 12 is separated from secondary sensor 13, the detected torque signal is an average value per revolution of torque-transmitting shaft 11. Thus the torsional oscillation having the frequency of about 200 Hz cannot be followed up and cannot be detected.

If one thin magnetic metal strip is used, the magnitude of detecting output obtained upon application of a torque in the positive direction differs from that in the negative direction. However, in the above embodiment, since the torque detecting section comprises a pair of components, outputs upon application of torques in both the positive and negative directions can be produced with good linearity.

The material of the thin magnetic metal strip in the above embodiment is not particularly limited. A preferred material is one which is used in the torque detecting apparatus in order to achieve the second object of the present invention, described later. In particular, by using thin magnetic metal strips $12_1$ and $12_2$ having saturated magnetostriction constants λs whose absolute values are less than $1 \times 10^{-6}$, i.e., $|λs| < 1 \times 10^{-6}$, excellent linearity can be maintained within a very wide range of torque value.

The torque detecting apparatus of the above embodiment will be described in detail by way of examples for detecting torques in practice.

EXAMPLES 1-3

A thin amorphous alloy strip having a width of about 5 mm and an average thickness of 30 μm was prepared by the single roll method. The strip was heated at 300° C. while a magnetic field having 2000 Oe in a 45° direction with respect to the longitudinal direction of the strip is applied. The heated strip was gradually cooled for one hour to provide induced magnetic anisotropy to the strip. The thin magnetic metal strip having the induced magnetic anisotropy was cut into pieces to constitute primary sensors $12_1$ and $12_2$. Sensors $12_1$ and $12_2$ were fixed on torque-transmitting shaft 11 having a diameter of 1 m. In addition, the second sensors (including detecting cores) and other necessary components were mounted and torque detection was performed as follows. The torque detecting section was biased with a power having a frequency of 1 kHz and a current of 5 mA, and changes in signals as FM waves from the torque detecting section were transmitted to receiver 28 through transmitting/receiving antenna 27. The FM signals were converted into a torque by a signal processor (not shown).

The composition of the thin amorphous alloy strip used in each example is as follows:

Example 1: $(Co_{0.95}Fe_{0.05})_{78}Si_8B_{14}$

Example 2: $(Co_{0.93}Fe_{0.03}Nb_{0.02})_{72}Si_{15}B_{13}$

Example 3: $(Co_{0.94}Fe_{0.06})_{79}B_{21}$

As a controller, torque detection was performed using a metal strain gauge in the torque-transmitting shaft as in the examples. In this case, a bias voltage was 10 V.

Figure 5:
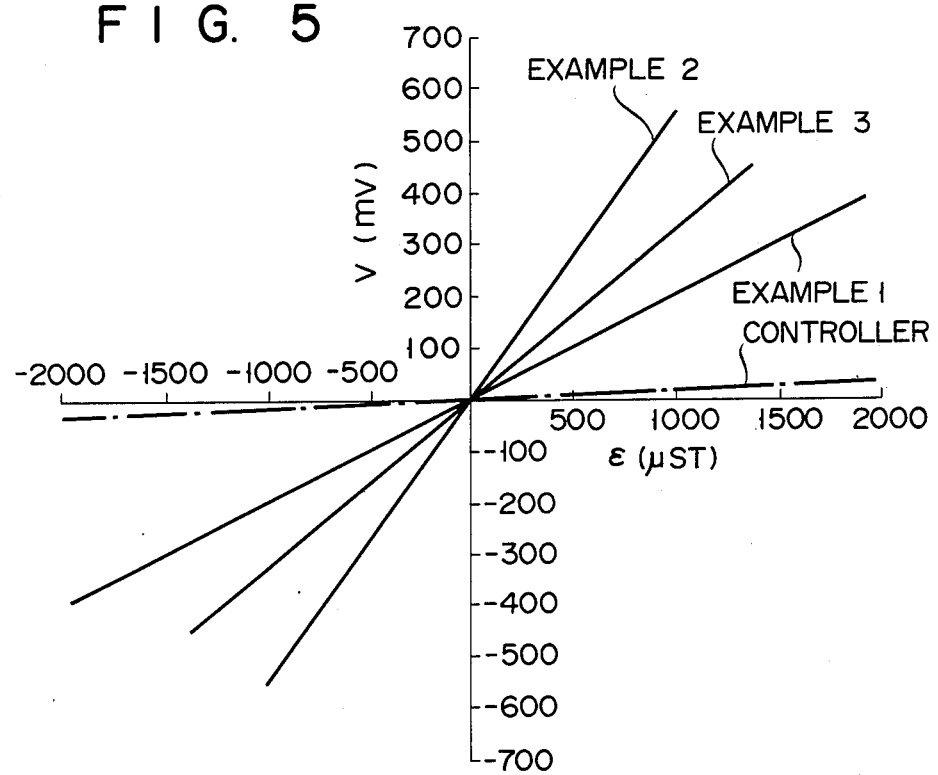
FIG. 5 is a graph showing output characteristics of the torque detecting apparatus shown in FIGS. 2 to 4.

Output characteristics in torque detection in the examples and the controller are shown in FIG. 5. In this case, the reference torque value is determined as a distortion value measured by a commercially available torque converter. The results of the examples and the controller show that the outputs with good linearity can be obtained by employing the arrangement of the above embodiment, unlike in the conventional results using the strain gauge.

A torque detecting apparatus for achieving the second object of the present invention will be described in detail.

In the torque detecting apparatus described above, its behavior will be described when the absolute value of the saturated magnetostriction constant $\lambda s$ of the thin magnetic metal strip is such that $|\lambda s| < 1 \times 10^{-6}$.

Torque T can be converted into surface stress $\sigma_A$ of the thin magnetic metal strip as follows:

$$\sigma_A = (16 G_A / \rho d^3 G_T) \cdot T \quad (1)$$

where $G_A$ is the rigidity of the thin magnetic metal strip, $G_T$ is the rigidity of the torque-transmitting shaft, and d is the diameter of the torque-transmitting shaft.

In the above torque detecting apparatus, the magnetostrictive effect by surface stress $\sigma_A$ can be measured.

According to the studies by the present inventors, linearity of the output in the torque detecting apparatus utilizing magnetoelastic effect was found to be greatly influenced by saturated magnetostriction constant $\lambda s$ and induced magnetic anisotropy KuO provided in advance to the thin magnetic metal strip. More specifically, if:

$$KuO / 3\lambda s \sigma_A \geq 2 \quad (2)$$

good linearity can be obtained within the following range:

$$T \leq (\rho d^3 / 16) \cdot (G_T / G_A) \cdot \sigma_A \quad (3)$$

A substitution of inequality (2) into inequality (3) yields inequality (4) having better linearity:

$$T \leq (\rho d^3 / 16) \cdot (G_T / G_A) \cdot (Ku_O / \lambda s) \quad (4)$$

The physical importance of the above studies is given as follows. If $Ku_O = 3\lambda s \sigma_A$, the axis of easy magnetization of the thin magnetic metal strip is unstable, and the output from the torque detecting apparatus is no longer linear and exhibits the saturation phenomenon. However, if $Ku_O$ is sufficiently larger than $3\lambda s \sigma_A$, such a saturation phenomenon does not occur. In this case, the direction of easy magnetization is slightly changed near $Ku_O$. In other words, the critical value for causing the saturation phenomenon is $KuO / 3\lambda s \sigma_A = 2$.

As is apparent from inequality (4), if $Ku_O / \lambda s$ is high, better linearity can be obtained in a wide range of torques. When a thin magnetic metal strip having large saturated magnetostriction constant $\lambda s$ is used to obtain good magnetostriction effect in the same manner as in the conventional torque sensor, good linearity of the torque detecting output cannot be expected unless the magnitude of induced magnetic anisotropy $Ku_O$ applied in advance to the thin magnetic metal strip is also large. However, the magnitude of anisotropy $Ku_O$ is practically limited to about $15 \times 10^3$ erg/cm$^3$. For this reason, linearity of the torque detecting output depends on only the magnitude of $\lambda s$. The smaller saturated magnetostriction constant $\lambda s$ is, the better linearity range of the torque detecting output is widened. In other words, if $\lambda s$ is increased, linearity of the output is inevitably degraded. That is why a very large torque of 5 kg/mm$^2$ cannot be detected by the conventional torque detecting apparatus. Even if such a large torque is to be measured with good linearity, the possible magnitude of induced magnetic anisotropy $Ku_O$ is larger than the possible critical value.

According to the studies of the present inventors, it was apparent that if saturated magnetostriction constant $\lambda s$ of the thin magnetic metal strip was decreased, anisotropy $Ku_O$ could be easily provided in a desired direction. A small $\lambda s$ means that when the thin magnetic metal strips are fixed on the surface of the torque-transmitting shaft and a stress caused by bending of the strips according to the curvature of the torque transmitting shaft is generated, the magnetic anisotropy applied in advance to the strips is not degraded. Therefore, adverse influences on the torque detecting characteristics can be reduced.

As is apparent from the above description, saturated magnetostriction constant $\lambda s$ of the thin magnetic metal strip must be small in order to obtain good linearity of the output in the torque detecting apparatus utilizing the magnetoelastic effect or in order to apply induced magnetic anisotropy to the thin magnetic metal strip in a desired direction. The present inventors found that good linearity (as the primary objective) of detection outputs in a wide range could be obtained if the absolute value of saturated magnetostriction constant $\lambda s$ is less than $1 \times 10^{-6}$.

If absolute value $|\lambda s|$ is small, sensibility is degraded. The lower limit of $|\lambda s|$ is determined by the practical detecting limit of the torque detecting apparatus. The lower limit of $|\lambda s|$ also depends on performance of a detector or the like and equipment excluding the thin magnetic metal strips and cannot be generally defined. If a present technical level is used as a reference, a sufficiently practical detection level can be obtained if $|\lambda s|$ is on the order of $10^{-9}$.

In the case of applying induced magnetic anisotropy $Ku_O$ to the thin magnetic metal strip by application of a magnetic field treating thereto, in order to obtain an ideal monoaxial magnetic anisotropy, $Ku_O$ must have a value exceeding a certain value. More specifically, $Ku_O > 1 \times 10^3$ erg/cm$^3$ is preferred. However, as is apparent from inequality (4), in order to obtain good linearity, it is preferred to increase $Ku_O / \lambda s$. In general, the $Ku_O$ is maximized.

The magnetic material constituting the thin magnetic metal strip can be selected from Permalloy (an Fe—Ni alloy), Sendust (an Fe—Al—Si alloy), and an Fe—Si alloy. However, an amorphous alloy is more preferable since it can provide a larger $Ku_O$ and a wider variable range of $Ku_O / \lambda s$.

A preferable amorphous alloy is a Co-based amorphous alloy containing Si, B, P, C, and the like as metalloid elements. In particular, the amorphous alloy preferably contains Si and B or may be a metal-metal amorphous alloy containing Zr, Hf, Ta, and Nb as amorphying elements. In these amorphous alloys, if a small amount of Fe is contained, a thin magnetic metal strip having zero magnetostriction, i.e., $\lambda s = 0$ is obtained.

The preferable composition of the amorphous alloy is represented by the following general formula:

$(Co_{1-a}Fe_a)_{100-z}(Si_{1-y}B_y)_z$ wherein $0.02 \leq a \leq 0.1$, $0.3 \leq y \leq 1.0$, and $5 \leq z \leq 32$.

In the above composition, Fe is added to obtain an amorphous alloy having almost zero magnetostriction. The value of a representing the content of Fe falls within the range of 0.02 to 0.1, and preferably 0.03 to 0.07.

A mixing ratio of Si to B as metalloid elements is the most important factor in the above amorphous alloy. Addition of B and Si allows easy production of an amorphous alloy. Si serves to improve thermal stability. In order to obtain a composition suitable in practical applications, the value of y representing the mixing ratio of Si to B must fall within the range of 0.3 to 1.0. If y is less than 0.3, it is difficult to prepare the amorphous alloy, and at the same time magnetic permeability $\mu$ is undesirably reduced. And thermal stability of magnetic characteristics are also slightly degraded.

The value of z representing the mixing ratio of Si to B falls within the range of 5 to 32. If z is less than 5, soft magnetic characteristics are degraded, and at the same time a good thin strip cannot be prepared. However, if z exceeds 32, the Curie point is lowered and thus a practical amorphous alloy cannot be obtained.

Another preferable amorphous alloy is represented by the following general formula:

$$(Co_{1-a-b}Fe_aM_b)_{100-z}(Si_{1-y}B_y)_z$$

wherein M is at least one element selected from the group consisting of Ti, V, Cr, Mn, Cu, Re, Zr, Nb, Mo, Hf, Ta, W, Ru, Rh, Ir, Pd, Pt, Ag, Au, Zn, Al, Ga, In, Ge, Sn, Pb, Sb, Bi, Y, and other rare earth metals; $0.02 \leq a \leq 0.1$; $0 \leq b \leq 0.15$; $0.3 \leq y \leq 1.0$; and $5 \leq z \leq 32$.

In the above composition, the M component is added and substituted with a moiety of Co and has properties for improving heat resistance and thermal stability of the amorphous alloy. These elements are added within the range enough not to lower the Curie point of the amorphous alloy below a practical temperature. More specifically, the maximum ratio of b is 0.15 although it depends on the M component. If the M component is Mn, Fe need not be added under the condition $b \geq 0.06$.

Another preferable amorphous alloy can be represented by the following general formula. This amorphous alloy is a metal-metal alloy which does not contain metalloid elements.

$$(Co_{1-c}M'_c)_{100-x}M''_x$$

wherein M' is at least one element selected from the group consisting of Fe, Ni, and Mn; M'' is at least one element selected from the group consisting of Zr, Hf, Ti, Nb, Ta, W, and B; $0 \leq c \leq 0.3$; and $2 \leq z \leq 35$.

An alloy material having a predetermined composition ratio is rapidly cooled from the melting state (a cooling rate of $10^{5°}$ C./sec or more) according to a conventional method to prepare any amorphous alloy having one of the compositions described above. These amorphous alloys are used in a thin plate manufactured by, e.g., the single roll method.

As is apparent from the above description, in the torque detecting apparatus utilizing the magnetoelastic effect for achieving the second object of the present invention, the absolute value of saturated magnetostriction constant $\lambda s$ of the thin magnetic metal strip used as the primary sensor satisfies condition $|\lambda s| < 1 \times 10^{-6}$. Therefore, other detailed arrangements of the torque detecting apparatus need not be specified or defined. For example, the thin magnetic metal strips may be separated from the secondary sensor in the same manner as in the conventional apparatus, or may be in contact therewith in the embodiment of FIGS. 2 and 3. An arrangement of the torque detecting apparatus is shown in FIGS. 6A and 6B.

Figure 6A:
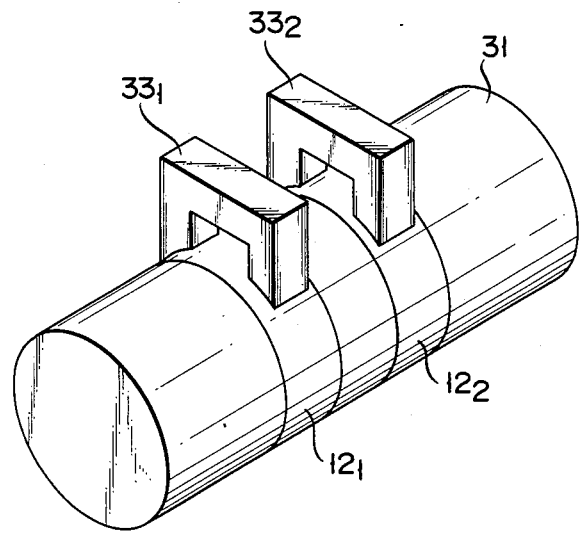
FIGS. 6A and 6B are views showing a torque sensor arranged to achieve the second object of the present invention.
Figure 6B:
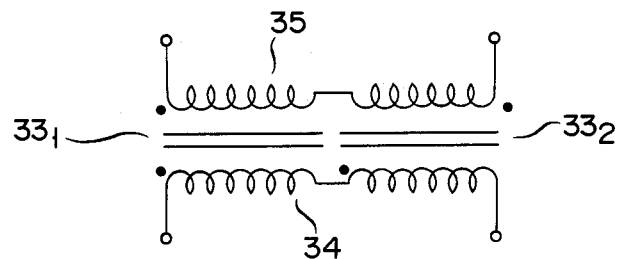

Referring to FIG. 6A, reference numeral 31 denotes a torque transmitting shaft having a diameter of 55 mm. A pair of thin annular magnetic metal strips $32_1$ and $32_2$ are fixed on the surface of the torque transmitting shaft along the circumferential direction thereof. Induced magnetic anisotropies are applied in advance to strips $32_1$ and $32_2$ in $+45°$ and $-45°$ directions with respect to the circumferential direction of shaft 31, respectively. U-shaped detecting cores $33_1$ and $33_2$ are positioned apart by 1 mm from strips $32_1$ and $32_2$, respectively. Cores $33_1$ and $33_2$ are made of a magnetic oxide. One pair of U-shaped detecting cores constitute a detecting head. As shown in FIG. 6B, excitation and detecting coils 34 and 35 are wound around cores $33_1$ and $33_2$, respectively. Detecting coils $35_1$ and $35_2$ are differentially connected for the same reason described with reference to the embodiment of FIGS. 2 and 3.

When thin annular magnetic metal strips $32_1$ and $32_2$ in the detecting head are excited, their excitation direction can be a widthwise direction. However, it is more effective to excite the strips in the circumferential direction since the strip shape provides a smaller diamagnetic coefficient in the circumferential direction and a excitation current can be small.

The torque detecting apparatus for achieving the second object of the present invention will be described in more detail by way of examples.

EXAMPLES 4–11

A thin amorphous alloy strip having a width of about 5 mm and an average thickness of 30 $\mu$m was prepared by the single roll method. The strip was heated at 300° C. while being applied with a magnetic field having 2,000 Oe in the 45° direction with respect to the longitudinal direction thereof. The heated and magnetized strip was gradually cooled for one hour to provide induced magnetic anisotropy to the strip.

The compositions of the thin amorphous alloy strips in Examples 4 to 11 are summarized in Table 1 below. Saturated magnetostriction constants $\lambda s$ of these strips were measured by a semiconductor gauge method and are listed in Table 1. As is apparent from these values, the thin magnetic metal strips of Examples 4 to 11 fall within the scope of the present invention. As controllers, thin magnetic metal strips (Controllers 1 to 4) which fall outside the scope of the present invention were also prepared.

TABLE 1

| | Composition | [$\lambda s$] | Saturated Torque (kg/mm²) |
|---|---|---|---|
| Example 4 | $(Co_{0.95}Fe_{0.05})_{78}Si_8B_{14}$ | $7 \times 10^{-7}$ | 5.0 |
| Example 5 | $(Co_{0.93}Fe_{0.05}Zr_{0.02})_{72}Si_{15}B_{13}$ | $8 \times 10^{-7}$ | 2.8 |
| Example 6 | $(Co_{0.94}Fe_{0.06})_{79}B_{21}$ | $1 \times 10^{-7}$ | 4.0 |
| Example 7 | $(Co_{0.93}Fe_{0.07})_{72}Si_{12}B_{16}$ | $9 \times 10^{-7}$ | 2.1 |
| Example 8 | $(Co_{0.93}Fe_{0.05}Cr_{0.02})_{72}Si_{15}B_{13}$ | $5 \times 10^{-7}$ | 3.5 |
| Example | $(Co_{0.94}Fe_{0.05}Nb_{0.01})_{77}Si_9B_{14}$ | $0.3 \times 10^{-7}$ | 19.0 |

TABLE 1-continued

| | Composition | [λs] | Saturated Torque (kg/mm²) |
|---|---|---|---|
| 9 | | | |
| Example 10 | $(Co_{0.945}Fe_{0.055})_{76}Si_8B_{16}$ | $3 \times 10^{-7}$ | 10.0 |
| Example 11 | $(Co_{0.98}Fe_{0.02})_{85}Nb_{15}$ | $6 \times 10^{-7}$ | 5.5 |
| Controller 1 | $(Co_{0.6}Fe_{0.4})_{78}Si_8B_{14}$ | $16.7 \times 10^{-6}$ | 0.4 |
| Controller 2 | $(Co_{0.1}Fe_{0.9})_{78}Si_8B_{14}$ | $40 \times 10^{-6}$ | 0.2 |
| Controller 3 | $(Co_{0.8}Fe_{0.15}Cr_{0.05})_{77}Si_9B_{14}$ | $8 \times 10^{-6}$ | 1.0 |
| Controller 4 | $(Co_{0.6}Fe_{0.4})_{78}Si_{10}B_{12}$ | $15 \times 10^{-6}$ | 0.55 |

The following magnetization measurement was performed for three samples having the compositions represented by $(Co_{1-a}Fe_a)_{78}Si_8B_{14}$ when a=0.05 (Example 4), a=0.4 (Controller 1), and a=0.9 (Controller 4). A magnetic field was longitudinally applied on the respective samples having magnetic anisotropy along the widthwise direction, and magnetization curves thereof were plotted. The test results are shown in FIG. 7.

Figure 7:
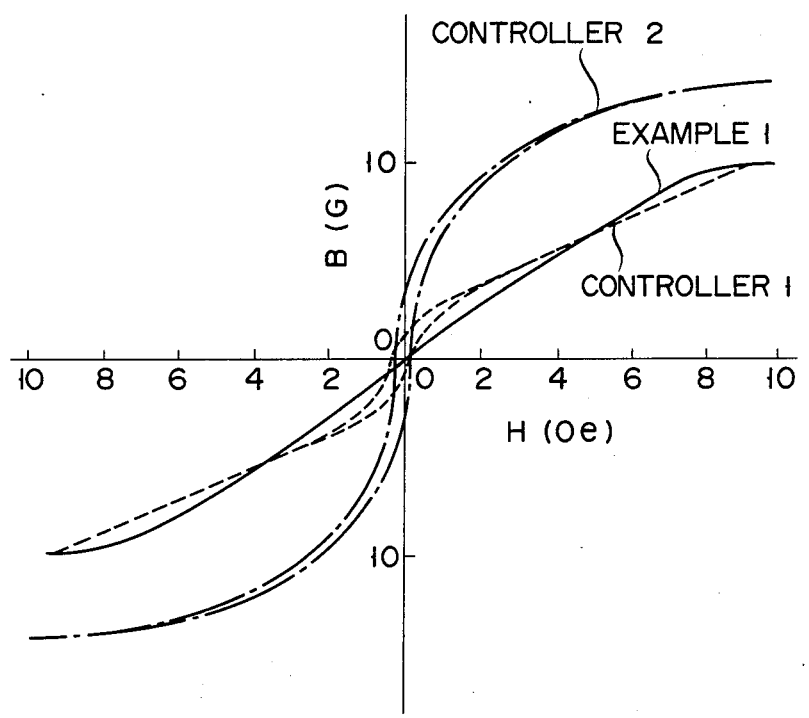
FIG. 7 is a graph showing a magnetization curve of the thin magnetic metal strip used in the torque sensor for achieving the second object of the present invention.

As is apparent from FIG. 7, when saturated magnetostriction constant λs is small, residual magnetic flux density at zero magnetic field is small and ideal magnetization curve along the axis of difficult magnetization can be obtained. This fact indicates that, the smaller magnetostriction constant λs is, the easier to apply induced magnetic anisotropy in a desired direction.

The thin magnetic metal strips described above were used as primary sensors $32_1$ and $32_2$ to prepare the torque detecting apparatus shown in FIGS. 6A and 6B. When a torque acting on torque-transmitting shaft 31 was detected for Examples 4 to 11 and Controllers 1 to 4 by the torque detecting apparatus, the detecting characteristics (saturated torques) listed in Table 1 were obtained. The saturated torques in the table show values when the torque detecting outputs are shifted from the linear region to the nonlinear region, i.e., possible critical values which are converted to surface stress values.

As is apparent from the torque detecting test results shown in Table 1, in Examples 4 to 11 wherein the values of saturated magnetostriction constants of thin magnetic metal strips $32_1$ and $32_2$ satisfy relation $|λs| < 1 \times 10^{-6}$, detecting outputs with good linearity can be produced in a wide range of large torque values. Therefore, the torque detecting apparatus can be effectively used in a system (e.g., a torque transmitting shaft in a rolling mill) wherein the torque load is dynamically changed in a wide range.

What is claimed is:

1. A torque detecting apparatus comprising:
   at least one pair of thin magnetic metal strips fixed on a torque transmitting shaft subjected to torque detection, and having magnetic anisotropy in a predetermined direction; and
   at least one pair of detecting cores paired with said at least one pair of thin magnetic metal strips, fixed in contact with said thin magnetic metal strips, each of the cores of said at least one pair of detecting cores having a detecting coil wound therearound.

2. An apparatus according to claim 1, further comprising:
   a transmitter fixed on said torque transmitting shaft, connected to said pair of detecting cores, and including a transmitting antenna; and
   a receiver spaced apart from said torque-transmitting shaft, and a signal processor circuit connected to said receiver; and
   wherein a torque detecting signal output from said pair of detecting cores is received, via said transmitter, by said receiver spaced apart from said torque-transmitting shaft, and a torque signal is detected by said signal processor circuit.

3. An apparatus according to claim 1, wherein said thin magnetic metal strip is composed of an amorphous alloy.

4. An apparatus according to claim 3, wherein the amorphous alloy has a composition represented by the following formula:

$$(Co_{1-a}Fe_a)_{100-z}(Si_{1-y}B_y)_z$$

wherein $0.01 \leq a \leq 0.5$; $0.3 \leq y \leq 1.0$; and $5 \leq z \leq 32$.

5. An apparatus according to claim 3, wherein the amorphous alloy has a composition represented by the following formula:

$$(Co_{1-a-b}Fe_aM_b)_{100-z}(Si_{1-y}B_y)_z$$

wherein M is at least one element selected from the group consisting of Ti, V, Cr, Mn, Cu, Re, Zr, Nb, Mo, Hf, Ta, W, Ru, Rh, Ir, Pd, Pt, Ag, Au, Zn, Al, Ga, In, Ge, Sn, Pb, Sb, Bi, Y, and other rare earth metals; wherein $0.01 \leq a \leq 0.5$; $0 \leq b \leq 0.15$; $0.3 \leq y \leq 1.0$; and $5 \leq z \leq 32$.

6. An apparatus according to claim 3, wherein the amorphous alloy has a composition represented by the following formula:

$$(Co_{1-c}M'_c)_{100-x}M''_x$$

wherein 9' is at least one element selected from the group consisting of Fe, Ni, and Mn; M" is at least one element selected from the group consisting of Zr, Hf, Ti, Nb, Ta, W, and B; wherein $0 \leq c \leq 0.3$; and $2 \leq z \leq 35$.

7. An apparatus according to claim 1, wherein an absolute value of the saturated magnetostriction constant λs of said thin magnetic metal strip is given by $|λs| < 1 \times 10^{-6}$.

8. A torque detecting apparatus wherein a thin magnetic metal strip having magnetic anisotropy in a predetermined direction, is fixed on a torque-transmitting shaft subjected to torque detection, stress corresponding to the torque imposed on said torque-transmitting shaft is applied to said thin magnetic metal strip, and a change in the magnetic characteristics of said thin magnetic metal strip is detected, to enable measurement of the torque imposed on said torque-transmitting shaft, characterized in that an absolute value of the saturated magnetostriction constant λs of said thin magnetic metal strip is given by $|λs| < 1 \times 10^{-6}$.

9. An apparatus according to claim 8, further comprising a detecting core located above said thin magnetic metal strip and separated therefrom, said detecting cores being provided with a detecting coil wound thereon.

10. An apparatus according to claim 8, further comprising a detecting core in contact with said thin magnetic metal strip, said detecting core being provided with a detecting coil wound thereon.

11. An apparatus according to claim 8, wherein said thin magnetic metal strip comprises at least one pair of strips.

12. An apparatus according to claim 8, wherein said thin magnetic metal strip is composed of an amorphous alloy.

13. An apparatus according to claim 12, wherein the amorphous alloy has a composition represented by the following formula:

$$(Co_{1-a}Fe_a)_{100-z}(Si_{1-y}B_y)_z$$

wherein $0.02 \leq a \leq 0.1$; $0.3 \leq y < 1.0$; and $5 \leq z \leq 32$.

14. An apparatus according to claim 12, wherein the amorphous alloy has a composition represented by the following formula:

$$(Co_{1-a-b}Fe_aM_b)_{100-z}(Si_{1-y}B_y)_z$$

wherein M is at least one element selected from the group consisting of Ti, V, Cr, Mn, Cu, Re, Zr, Nb, Mo, Hf, Ta, W, Ru, Rh, Ir, Pd, Pt, Ag, Au, Zn, Al, Ga, In, Ge, Sn, Pb, Sb, Bi, Y, and other rare earth metals; wherein $0.02 \leq a \leq 0.1$; $0 \leq b \leq 0.15$; $0.3 \leq y \leq 1.0$; and $5 \leq z \leq 32$.

15. An apparatus according to claim 12, wherein the amorphous alloy has a composition represented by the following formula:

$$(Co_{1-c}M'_c)_{100-x}M''_x$$

wherein M' is at least one element selected from the group consisting of Fe, Ni, and Mn; M'' is at least one element selected from the group consisting of Zr, Hf, Ti, Nb, Ta, W, and B; wherein $0 \leq c \leq 0.3$; and $2 \leq z \leq 35$.

* * * * *